Figures 1, 2:
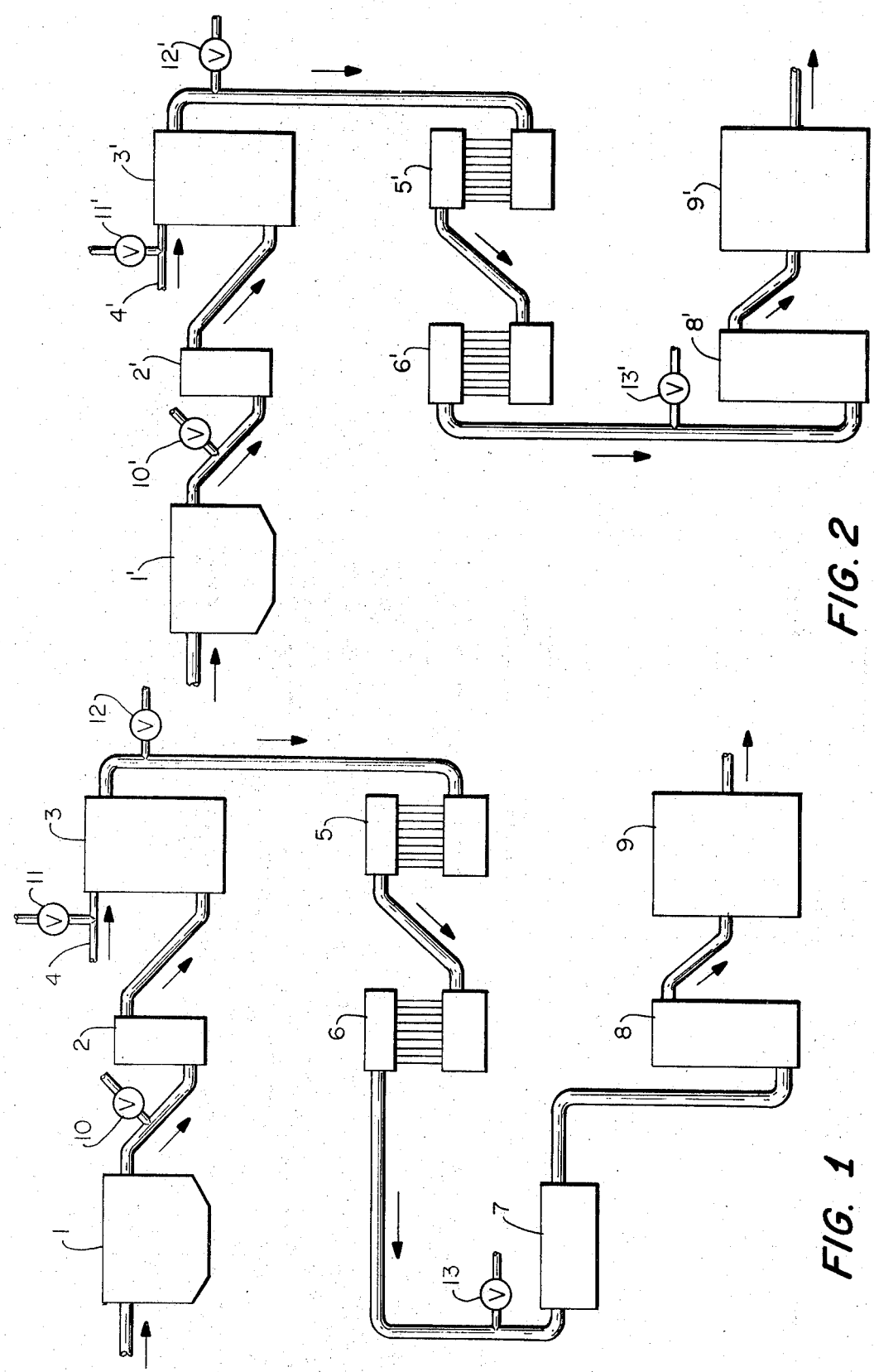

United States Patent [19]
Brockmiller et al.

[11] 3,855,387
[45] Dec. 17, 1974

[54] METHOD FOR REMOVING MERCURY FROM INDUSTRIAL GASES

[75] Inventors: Charles Anthony Brockmiller; Robert E. Lund; John Edward Fitzsimmons, all of Monaca, Pa.

[73] Assignee: St. Joe Minerals Corporation, New York, N.Y.

[22] Filed: Sept. 5, 1973

[21] Appl. No.: 394,514

[52] U.S. Cl.............. 423/210, 423/215.5, 423/539, 423/542, 423/561
[51] Int. Cl............................................ B01d 53/34
[58] Field of Search ........ 423/210, 215.5, 539, 561, 423/542; 55/72, 99, 107

[56] References Cited
UNITED STATES PATENTS
3,661,509  5/1972  Ferrara et al...................... 423/210
3,786,619  1/1974  Melkersson et al............. 423/210 X Primary Examiner—Earl C. Thomas
Attorney, Agent, or Firm—Cameron, Kerkam, Sutton, Stowell & Stowell

[57] ABSTRACT

Mercury is removed from sulfur dioxide containing industrial gases preparatory to catalytic oxidation of the sulfur dioxide by admixing hydrogen sulfide with the gas and thereafter subjecting the gas to a suspended solids removal operation.

4 Claims, 2 Drawing Figures

METHOD FOR REMOVING MERCURY FROM INDUSTRIAL GASES

In the manufacture of sulfuric acid from sulfur dioxide-bearing gases, the presence of mercury vapor in the gases may lead to unacceptably high mercury content in the finished acid. Although historically the presence of mercury in sulfuric acid has not been much of a problem, there are indications that in the future the maximum allowable mercury concentrations in sulfuric acid may be specified at levels that are lower than now common. Present methods for manufacture of sulfuric acid from metallurgical gas cannot cope adequately with the mercury vapor commonly carried over in the sulfur dioxide gas, from roasting sulfide ores, which is to be converted into sulfuric acid.

It is therefore an object of the invention to provide means for removal of a substantial portion of the mercury vapor present in the raw sulfur dioxide gas derived from metallurgical roasting operations.

It is another object of the invention to provide mercury removal means adapted to a variety of metallurgical gas purification systems.

It is a further object of the invention to ease the burden on the final cleanup of mercury from product acid by lowering the amount of mercury entering the acid in the first place.

It is still another object of the invention to recover at least a portion of the mercury in a form amenable to further treatment for the production of metallic mercury.

In the manufacture of sulfuric acid from metallurgical gases, it is common practice to roast — that is, to oxidize — such sulfide-bearing minerals as iron pyrites, zinc sulfide, lead sulfide, copper sulfide, and the like, to produce an offgas containing 2 – 17 percent sulfur dioxide together with nitrogen, oxygen, water vapor, and minor gaseous constituents such as argon and carbon dioxide. The gases exiting the roaster are hot and burdened with metallurgical dusts and fumes.

The first step of purification ordinarily is to remove the major portion of the particulate matter by passing the gases through an electrostatic precipitator (hot Cottrell). The de-dusted gases are then chilled and scrubbed by irrigation in a packed tower with water or weak sulfuric acid. In some systems, the packed tower is preceded by an unpacked spray tower — termed a humidifying tower. The cooled, de-dusted gases then pass through an electrostatic mist Cottrell which removes tiny droplets of sulfuric acid mist. In some purifications systems, the now de-misted gas proceeds directly to gas drying towers; in other systems, the de-misted gas is further cleaned by passing through a coke filter — that is, a bed of coke particles typically 2–6 feet in depth. The now cleaned gases then are treated with strong (about 93 percent) sulfuric acid to remove water vapor therefrom.

The cleaned, dry gases are then propelled through a series of heat exchangers to prepare the sulfur dioxide for combustion to sulfur trioxide by passage through one or more beds of catalyst (usually vanadium pentoxide; occasionally platinum black). The so-produced $SO_3$ after cooling by reverse passage through the heat exchangers is then absorbed by scrubbing with 98.5–99 percent sulfuric acid. This acid, after adjustment to standard commercial strength — such as 93 percent sulfuric acid — constitutes the normal end product of the process.

If the amount of mercury vapor present in the roaster exit gases is great enough, some will condense when the gases are chilled and will appear in the mist Cottrell and/or coke box drips as metallic mercury. Most metallurgical gases do not contain this much mercury and, in any event, the mercury vapor in the chilled gases below the point of saturation continues on to the dry tower where it is absorbed by the sulfuric acid. Since the drying tower is in closed circuit with the $SO_3$ absorbers, a portion of the mercury will report in the finished acid.

Historically, where control of maximum level of mercury in product acid has been necessary, it has generally been possible to accomplish this by selecting roaster feedstocks that are not high in mercury. With the new, much lower, maximum mercury level specifications now becoming prevalent for sulfuric acid, even relatively low mercury content feedstocks produce enough mercury to cause the mercury level in the product acid to exceed permissible levels.

While there are ways to remove mercury from sulfuric acid by treatment with various reagents followed by filtration, time-temperature control, and other techniques — these processes are relatively expensive and for economic reasons should be reserved for making only the purest acid. When such acid purification methods must be used, however, it is desirable to prevent as much mercury as possible from entering the acid in the first place.

We have found that a substantial portion of mercury vapor may be precipitated from the $SO_2$ gas stream in the purification system by introducing modest amounts of hydrogen sulfide gas at selected points in the purification system. In general, the amount of hydrogen sulfide is at least equivalent to one molecule of $H_2S$ for each atom of mercury in the gas.

For those purification systems which include a coke filter following the mist Cottrell, the preferred point of introducing the hydrogen sulfide is into the gas duct between the mist Cottrell and the coke filter.

For those purification systems in which the demisted gas passes directly from the mist Cottrell to the drying tower, mercury removal can be effected by feeding hydrogen sulfide gas into the hot gas duct between the exit of the hot Cottrell and the entrance to the humidifying-scrubbing tower.

The invention will be further described with reference to the accompanying drawings in which FIG. 1 is a diagrammatic representation of a gas purification train including a coke filter; and FIG. 2 is a diagrammatic representation of a gas purification train which does not include a coke filter.

In the purification train of FIG. 1, metallurgical roaster gas enters a hot electrical precipitator 1 and then passes successively through humidifying tower 2, scrubbing tower 3 which is supplied with scrubbing liquor through pipe 4, primary mist precipitator 5 and secondary mist precipitator 6, coke filter 7, drying tower 8 and catalytic converter 9 wherein the sulfur dioxide content of the gas is converted to sulfur trioxide.

Hydrogen sulfide gas may be injected into the system at any one or more points 10, 11, 12 or 13. In a test run in which gas flow from a zinc sulfide ore roaster was 17,000 standard cubic feet per minute (SCFM) producing sulfuric acid containing approximately 40 parts per million (100 percent H₂SO₄) of mercury, the mercury content of the acid was reduced to 7.5 parts per million by introducing 0.091 SCFM of hydrogen sulfide at point 13 of the system.

In FIG. 2, the elements of the purification train are given primed numbers corresponding to the like elements of FIG. 1.

In a test run in which gas flow from a zinc sulfide ore roaster was passed into precipitator 1' at 21,200 SCFM producing sulfuric acid at a rate of 225 tons (100 percent H₂SO₄) per day with a mercury content of approximately 20 parts per million introduction of 0.018 SCFM of hydrogen sulfide at point 10' reduced the mercury content of the sulfuric acid to 5.7 parts per million.

I claim:

1. The method of removing mercury from sulfur dioxide containing industrial gas preparatory to catalytic oxidation of the sulfur dioxide which comprises admixing hydrogen sulfide with the gas and thereafter subjecting the gas to a suspended solids removal operation prior to the catalytic oxidation of the sulfur dioxide.

2. The method of removing mercury from sulfur dioxide containing industrial gas as defined in claim 1 wherein the suspended solids removal operation includes passing the gas through a coke filter.

3. The method of removing mercury from sulfur dioxide containing industrial gas as defined in claim 1 wherein the suspended solid removal operation includes passing the gas through an electrical precipitator.

4. The method of removing mercury from sulfur dioxide containing industrial gas as defined in claim 1 wherein the amount of hydrogen sulfide added to the gas is equivalent to at least one molecule to each atom of mercury in the gas.

* * * * *